United States Patent Office 2,842,643
Patented July 8, 1958

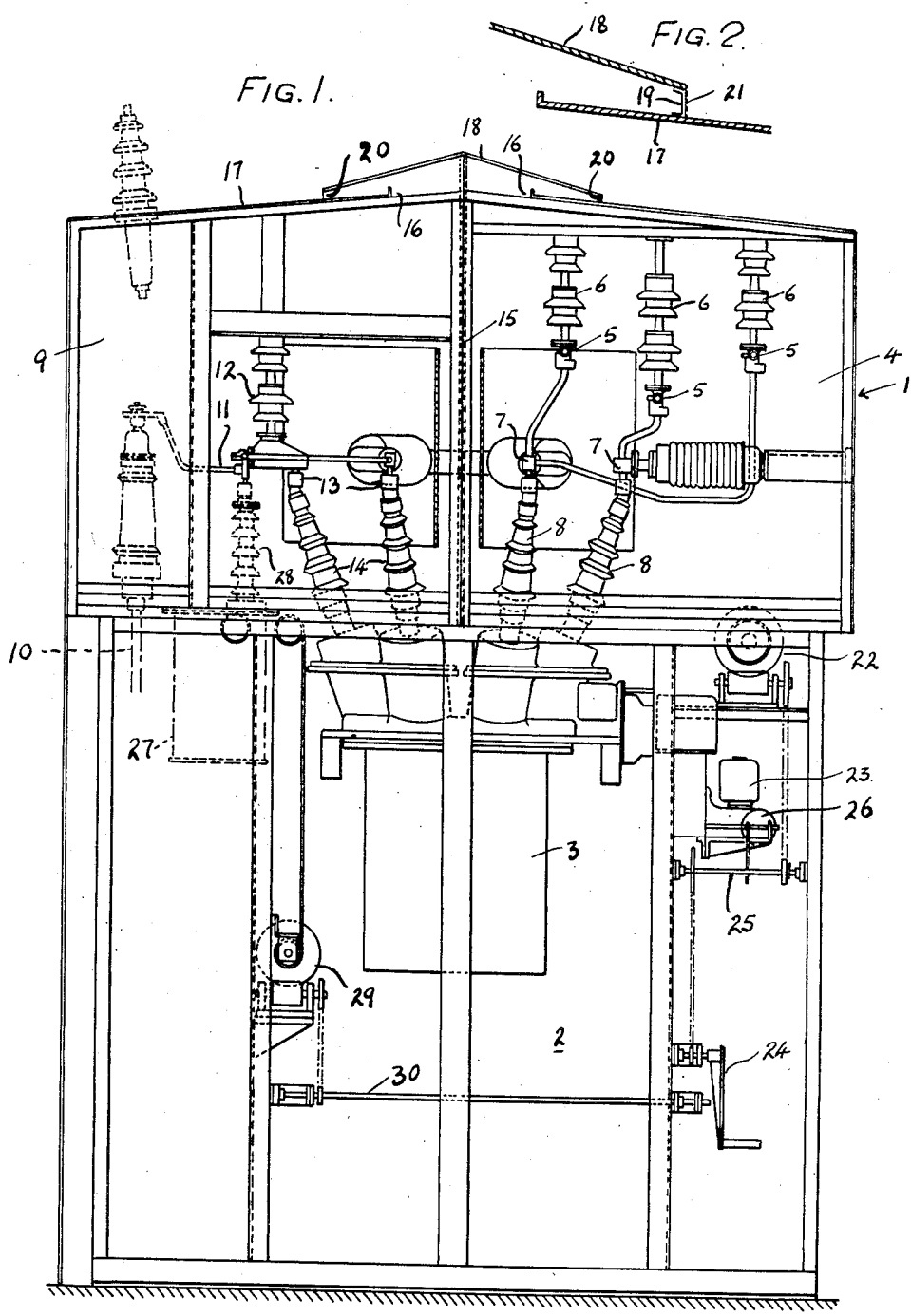

2,842,643

HIGH VOLTAGE SWITCHGEAR

Alfred James Nicholas, Machen, and Ronald Norton Buttrey, Newport, England, assignors to South Wales Switchgear Limited, Blackwood, England Application October 3, 1955, Serial No. 538,235

Claims priority, application Great Britain October 6, 1954

2 Claims. (Cl. 200—144)

The present invention relates to high voltage switchgear more particularly of the enclosed, air insulated type employed for effecting connection between two sets of electrical conductors.

Such switchgear usually takes the form of enclosed units in which each set of conductors is supported upon insulator units and enclosed within a chamber, the two chambers being separated by a common dividing wall. A means is provided for connecting the conductors of each chamber to a switching device which may comprise for example a metal clad oil immersed circuit breaker positioned beneath the conductor chambers and movable vertically into and out of engagement with the said connecting means.

The conductor chambers should of course be ventilated to atmosphere and according to the present invention each chamber is separately vented to atmosphere, the arrangement being such that there is substantially no possibility of communication of gases or products of explosion from one chamber to the other. The chambers are conveniently vented to atmosphere through the roof of the unit and the outlets from the respective chambers are spaced apart and are oppositely directed so as to preclude the above mentioned possibility of communication between the chambers.

According to a further feature of the invention, the ventilation is unrestricted and the said outlets are provided with a screen such as for example of metal gauge to prevent the ingress into the chambers of birds and insects and also to prevent rain or snow from being blown into the chambers.

The invention finds special application in the case of high voltage, air insulated isolating switch units as described in the specification of our co-pending patent application Serial No. 376,182, filed August 24, 1953, and one such unit constructed according to the present invention will now be described with reference to the accompanying drawings in which:

Figure 1 is a sectional elevation of the switch unit, and

Figure 2 is a detail drawn to an enlarged scale.

As will be seen from the drawings the unit comprises a framework indicated generally at 1 supporting sheet metal panels 2 to form a closed housing in the lower portion of which there is positioned an enclosed oil immersed type circuit breaker 3.

Along the front of the upper portion of the housing there extends a bus-bar chamber 4 in which the bus-bars 5 are supported by insulators 6 secured to the roof 17 of the unit and are provided with releasable connectors 7 for engaging the bus-bar terminals 8 of the circuit breaker 3. The rear portion of the upper part of the housing constitutes a feeder chamber 9 into which is fed a feeder cable 10 connected to conductors 11 supported in the feeder chamber by insulators 12 and having, as in the case of the busbars, releasable connectors 13 for engaging the corresponding terminals 14 of the circuit breaker.

The busbar chamber and the feeder chamber are separated by a vertically extending wall 15 extending transversely of the unit, the said wall extending upwardly through an aperture 16 in the roof 17 of the unit to divide the aperture into two portions, one of which communicates with the busbar chamber and the other with the feeder chamber.

The wall 15 extends upwardly a substantial distance above the roof 17 and supports a metal sheeting 18 which extends forwardly and rearwardly therefrom over the aperture and vertically spaced from the roof. The said sheeting extends a substantial distance in each direction beyond the corresponding edge of the aperture and slopes downwardly toward the roof to be supported thereon in spaced relation therewith at the forward and rearward end of the sheeting respectively by brackets 19 (Fig. 2) to define an elongated rectangular opening 20 which gives access to the corresponding portion of the aperture in the roof.

The busbar and feeder chambers are thus each individually vented to atmosphere through the corresponding portion of the aperture 16 in the roof of the unit and through the corresponding opening 20 formed between the metal sheeting 18 and the roof 17. The said openings are spaced apart a substantial distance and face in opposite directions thereby minimising the possibility of flash over from one opening to the other, while the upwardly extending dividing wall separates the busbar and the feeder chambers and there is substantially no possibility of communication of gases or products of explosion from one chamber to the other.

In order to prevent the ingress of birds or insects into the chambers, the openings 20 are covered over with a perforated screen in the form of metal gauze 21 secured to the brackets 19 (Fig. 2) which also serves to prevent rain or snow from being blown through the openings into the respective chambers.

Switchgear of the kind to which the present invention relates normally includes some form of power raising and lowering device for the circuit breaker. For example, electric motor operated screw lifts or a portable hydraulic jacking device may be used.

According to a feature of the invention, a wire rope or the like lifting and lowering means for the circuit breaker is provided. The said means includes a winch 22 adapted to be driven selectively by a small electric motor 23 or manually by a handle 24. The winch 22 is thus driven from a countershaft 25 to which the motor 23 and the handle 24 are operatively connected to enable the countershaft to be rotated either by the motor or by the handle. In the case of the motor drive, a friction clutch 26 prevents over winding, and no other protection device such as a limit switch is required.

The switch unit is also provided with a voltage transformer 27 having upwardly extending terminal bushings 28 engaging the feeder conductors 11. The transformer 27 is mounted for vertical movement to enable it to be lowered to isolate it from the feeder conductors. The raising and lowering of the transformer 27 is effected manually by a further winch 29 driven from a shaft 30 to which a handle can be releasably secured. For example the handle 24 can be made so that it can be employed either to drive the winch 22 in the aforedescribed manner, or to drive the shaft 30 for winding the further winch 29.

It will be understood that the invention is not limited to the above described form of switch unit. For example the unit may be of the type for connecting together two sets of busbars in which case the feeder cable chamber 9 would be replaced by a second busbar chamber in which a second set of busbars are accommodated.

We claim:

1. A high voltage enclosed air-insulated switch unit comprising a metal-clad housing, a roof and side walls for said housing, a feeder cable compartment and a busbar chamber contiguous therewith, positioned immediately beneath the roof, a feeder cable extending into said feeder compartment, busbars supported upon insulators in said busbar chamber, a circuit breaker supported below said feeder compartment and busbar chamber for vertical movement into and out of electrical conducting relation with the feeder cable and the busbars for establishing a switch connection therebetween, an opening in said roof extending over the feeder compartment and the busbar chamber, a common dividing wall between said feeder compartment and busbar chamber extending upwardly through the said opening and above the roof to define with the opening a pair of vents communicating respectively with the feeder compartment and with the busbar chamber, an upper edge to said dividing wall, sheet members extending from the said upper edge of the dividing wall on each side thereof over the said vents and a substantial distance over the roof, and in spaced relation therewith to define oppositely directed vent openings for separately venting the said feeder compartment and busbar chamber respectively.

2. A high voltage enclosed air-insulated switch unit as claimed in claim 1 including a perforated screen over each of said oppositely directed vent openings for preventing the ingress of birds or insects into the feeder compartment or the busbar chamber.

References Cited in the file of this patent

UNITED STATES PATENTS

| | | |
|---|---|---|
| 702,584 | Paquette | June 17, 1902 |
| 1,293,842 | MacDonald | Feb. 11, 1919 |
| 1,599,644 | Burnham | Sept. 14, 1926 |
| 2,035,771 | Thumim | Mar. 31, 1936 |
| 2,218,555 | Rossman | Oct. 22, 1940 |
| 2,282,232 | MacDonald et al. | May 5, 1942 |
| 2,357,603 | Pinkham et al. | Sept. 5, 1944 |
| 2,376,471 | Bevan | May 22, 1945 |
| 2,379,188 | Rugg | June 26, 1945 |

FOREIGN PATENTS

| | | |
|---|---|---|
| 367,491 | Great Britain | Feb. 25, 1932 |
| 503,886 | France | Mar. 27, 1920 |